US008370645B2

(12) United States Patent
Asnaashari

(10) Patent No.: US 8,370,645 B2
(45) Date of Patent: Feb. 5, 2013

(54) PROTECTION OF SECURITY PARAMETERS IN STORAGE DEVICES

(75) Inventor: Mehdi Asnaashari, Danville, CA (US)

(73) Assignee: Micron Technology, Inc., Boise, ID (US)

( * ) Notice: Subject to any disclaimer, the term of this patent is extended or adjusted under 35 U.S.C. 154(b) by 295 days.

(21) Appl. No.: 12/397,149

(22) Filed: Mar. 3, 2009

(65) Prior Publication Data

US 2010/0229004 A1    Sep. 9, 2010

(51) Int. Cl.
*G06F 21/00* (2006.01)
(52) U.S. Cl. ......................................... 713/193; 711/173
(58) Field of Classification Search .................. 713/193; 711/173, E12.092
See application file for complete search history.

(56) References Cited

U.S. PATENT DOCUMENTS

| | | | |
|---|---|---|---|
| 5,901,311 A | 5/1999 | Labatte et al. | |
| 6,330,653 B1 * | 12/2001 | Murray et al. | 711/173 |
| 7,370,166 B1 * | 5/2008 | Ramesh et al. | 711/163 |
| 2003/0154355 A1 | 8/2003 | Fernandez | |
| 2004/0059916 A1 | 3/2004 | Mizushima et al. | |
| 2004/0088562 A1 | 5/2004 | Vassilev et al. | |
| 2004/0103288 A1 | 5/2004 | Ziv et al. | |
| 2004/0143730 A1 | 7/2004 | Wen et al. | 713/150 |
| 2004/0149827 A1 | 8/2004 | Zuili | |
| 2004/0232247 A1 | 11/2004 | Tsunoda et al. | |
| 2004/0255145 A1 | 12/2004 | Chow | |
| 2005/0035200 A1 | 2/2005 | Hendrick | |
| 2005/0086471 A1 | 4/2005 | Spencer | 713/165 |
| 2006/0043202 A1 | 3/2006 | Kim et al. | |
| 2006/0117190 A1 | 6/2006 | Morita | |
| 2006/0126422 A1 | 6/2006 | Takagi et al. | |
| 2006/0138217 A1 | 6/2006 | Connelly et al. | |
| 2006/0174352 A1 | 8/2006 | Thibadeau | 726/27 |
| 2006/0184806 A1 | 8/2006 | Luttmann et al. | 713/193 |
| 2007/0002612 A1 | 1/2007 | Chang et al. | |
| 2007/0043667 A1 | 2/2007 | Qawami et al. | |
| 2007/0113097 A1 | 5/2007 | Wang | |

(Continued)

FOREIGN PATENT DOCUMENTS

| | | |
|---|---|---|
| EP | 1 549 020 A2 | 6/2005 |
| JP | 62-236055 | 10/1987 |

(Continued)

OTHER PUBLICATIONS

Wu et al. "A Low Cost and Inner-Round Pipeline Design of ECB-AES-256 Crypto Engine for Solid State Disk"; 2010 Fifth IEEE International Conference on Networking, Architecture, and Storage; pp. 485-491.

*Primary Examiner* — Jung Kim
*Assistant Examiner* — Ayoub Alata
(74) *Attorney, Agent, or Firm* — Dorsey & Whitney LLP

(57) ABSTRACT

Security parameters used to encrypt data stored on a storage device may be protected using embodiments of systems and methods described herein. During a resize operation, data stored on a memory unit in the storage device may be altered prior to communicating an updated partition size to a host computer. In some examples, data is altered prior to storing the updated partition sizes in the storage device. In this manner, a host system may not receive the updated partition sizes until after the data is altered. Altering data may avoid exposure encrypted data, information about one or more security parameters used to encrypt data on the memory unit or decrypt data retrieved from the memory unit, or combinations thereof.

27 Claims, 5 Drawing Sheets

U.S. PATENT DOCUMENTS

| | | |
|---|---|---|
| 2008/0052532 A1 | 2/2008 | Akkar et al. .................. 713/189 |
| 2009/0121028 A1 | 5/2009 | Asnaashari et al. |
| 2009/0121029 A1 | 5/2009 | Asnaashari et al. |
| 2009/0254715 A1 | 10/2009 | Jeong |
| 2010/0023747 A1 | 1/2010 | Asnaashari et al. .......... 713/150 |
| 2010/0229004 A1 | 9/2010 | Asnaashari |
| 2012/0191975 A1 | 7/2012 | Asnaashari et al. |

FOREIGN PATENT DOCUMENTS

| | | |
|---|---|---|
| JP | 08-167013 | 6/1996 |
| JP | 2002-229861 | 8/2002 |
| WO | WO-2004/055680 A1 | 7/2004 |
| WO | 2008/008326 A2 | 1/2008 |

* cited by examiner

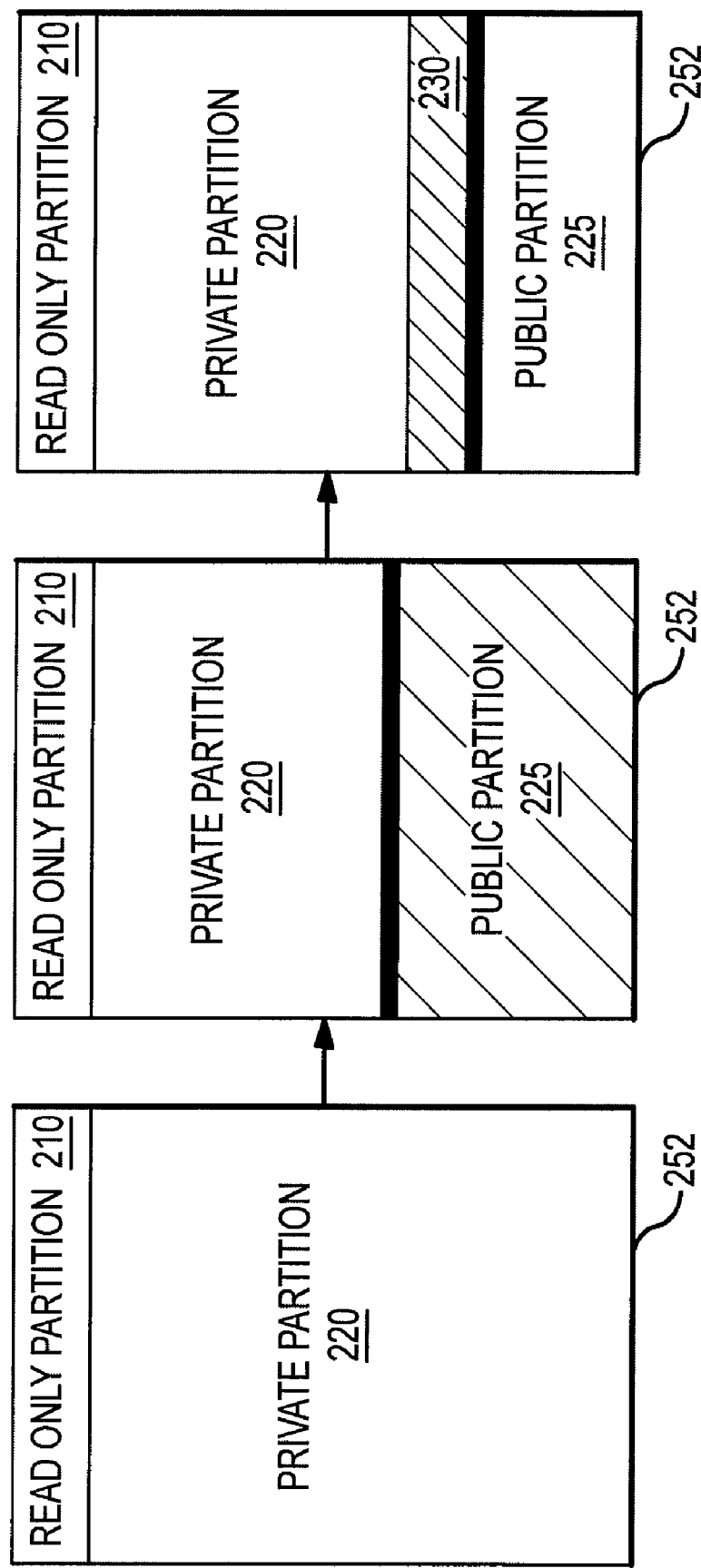

PROTECTION OF SECURITY PARAMETERS IN STORAGE DEVICES

TECHNICAL FIELD

Embodiments of the invention relate generally to electronic storage devices, and more particularly, to the protection of data, security parameters, or both associated with a secure partition of a memory unit.

BACKGROUND OF THE INVENTION

Mass storage devices may include memory having a secure partition. Encrypted data, generated by an encryption method, may be stored in the secure partition. Generally, data may be received from a host computer, encrypted by an encryption engine on the mass storage device, and stored as encrypted data in the secure partition. Encrypted data may be retrieved by the controller on the mass storage device, decrypted by the encryption engine, and sent as unencrypted data to the host computer. In this manner, unencrypted data is sent on an interface between a host processor and a controller on the mass storage device, while encrypted data is sent on an interface between the mass storage device controller and the secure partition. Accordingly, no encrypted data is generally present on the interface between the mass storage device and the host computer which may be, for example, a USB interface. Ensuring that encrypted data is not present on the interface between the host computer and the mass storage device may help protect the encryption methodology and any keys used during the encryption method because the encrypted data may not be easily intercepted.

A size of the secure partition as well as other partitions such as public partitions and read only partitions are stored on the mass storage device. The mass storage device may communicate the size of these partitions in response to query from the host computer. Sometimes, these partitions may be resized to take up a larger or smaller portion of the memory on the mass storage device. Updated sizes of the partitions will replace the values already in the mass storage device. Resized partitions will typically require reformat by the host computer in accordance with the updated partition size.

BRIEF DESCRIPTION OF THE DRAWINGS

FIGS. 3A-3C are a schematic illustrations of resizing partitions of a user data segment of a memory unit on a mass storage device.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Figure 1:
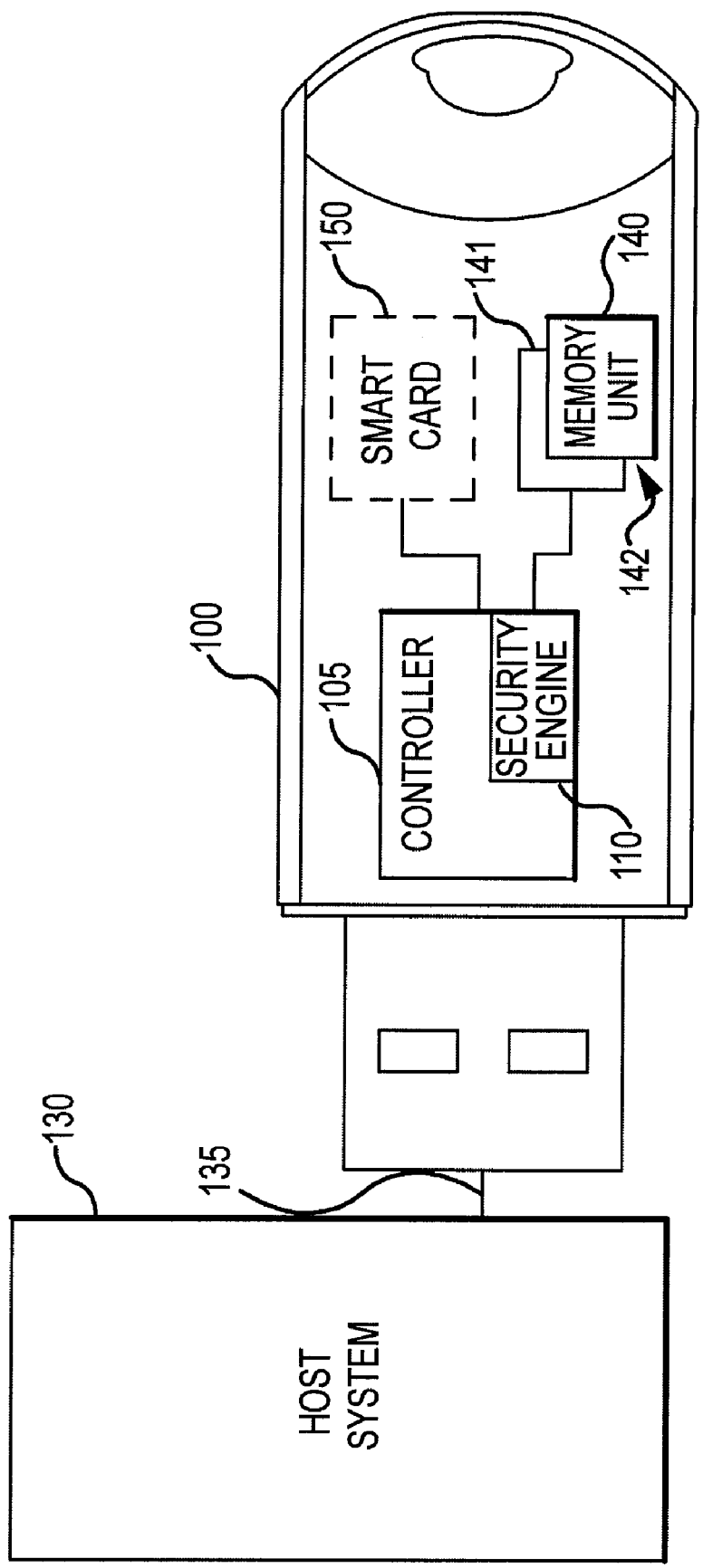
FIG. 1 is a schematic illustration of a mass storage device connected to a host system.

FIG. 1 is a schematic illustration of a USB storage device 100. Although a USB storage device is shown in FIG. 1, other types of storage devices may also be implemented according to embodiments of the present invention, and the USB storage device 100 is described by way of example only. The storage device 100 includes a controller 105. The controller 105 may include a processor and memory suitable for performing functions described herein. The controller 105 includes a security engine 110. The security engine 110 may be a cryptography engine such as but not limited to an advanced encryption services (AES) engine. The security engine 110 may provide a variety of functions including, but not limited to, AES protocols or user authentication protocols, such as Public Key Infrastructure ("PKI") authentication, encryption and decryption of data. The security engine 110 may be AES, True Random Number Generator (TRNG), Hashing algorithm such as SHA-128 and SHA-256, or signature generation and verification, in some examples. Other interfaces such as SATA and PCIe may also be used in other embodiments. The controller 110 may communicate with a host system 130 over an interface 135, which may be a USB interface. Although a USB interface 135 is shown in FIG. 1 to communicate with the USB storage device 100, other interfaces may also be used in other embodiments. The interface used may depend on the choice of storage device and may include a wireless interface, Bluetooth interface, magnetic interface such as for an access card, an optical interface, or an ISO 7816 interface for use with an ISO 7816 card reader, for example.

The controller 105 may be coupled to a smart card device 150, although the smart card device 150 may not be present in all embodiments. The smart card device 150 may include a memory storing an operating system for the smart-card device 150. The smart-card device 150 may also include a file management system, and a key management system for managing and storing one or more encryption and/or decryption keys, such as, but not limited to, one or more AES encryption and/or decryption keys. The smart card device 150 may generally store a variety of security parameters and applications that provide various functionalities to the mass storage device 100. Examples of security parameters and applications that may be stored, executed, or both by the smart card device include, but are not limited to, private keys, certificates that may include public keys as part of public/private key encryption, electronic banking applications, and telephone applications. The smart card device 150 may also store partition sizes of partitions on the memory unit 142, including memory devices 140, 141, to be described further below.

The controller 105 is coupled to one or more memory unit. Although two memory devices 140, 141 are shown in FIG. 1, generally any number may be used and accessed by the controller 105. Generally, the memory unit stores data. The controller 105 generally facilitates reading data to, and writing data from the memory unit 142 and communicating with the host system 130. The memory unit 142 may include any type of memory devices, such as but not limited to, flash memory devices such as NAND flash memory devices. The memory unit is connected to the controller 105 via an appropriate input/output interface, such as a flash memory interface. The interface may, of course, use other types of communications links, such as a high-speed link with one or more lanes through which all signals are coupled, or a more conventional memory device bus system including a command bus through which memory commands are coupled from the controller 105 to the memory unit 142, an address bus through which addresses are coupled from the controller 105 to the memory unit 142, and a data bus over which write data are transmitted from the controller 105 to the memory unit 142 and read data are received by the controller 105 from the memory unit 142.

Figure 2A:
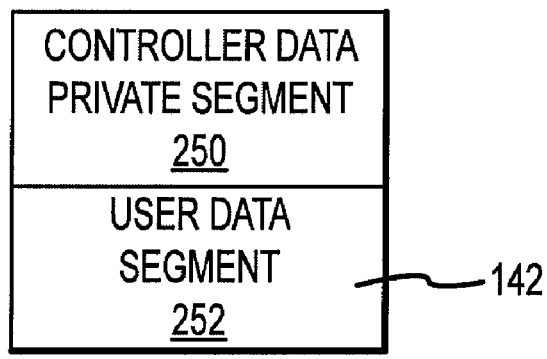
FIG. 2A is a schematic illustration of segments of a memory unit on a mass storage device.
Figure 2B:
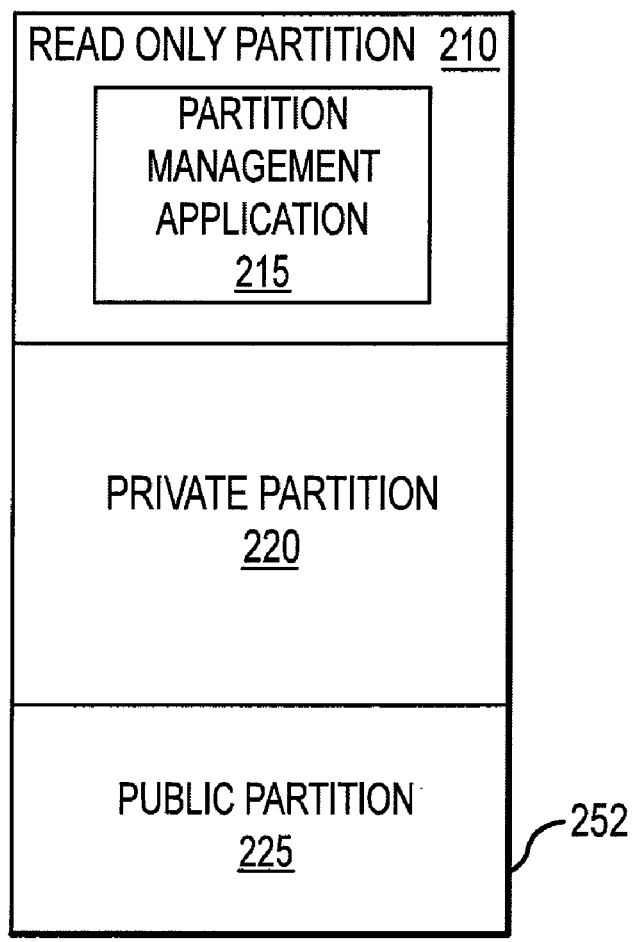
FIG. 2B is a schematic illustration of partitions of a user data segment of a memory unit on a mass storage device.

FIG. 2A is schematic illustration of segments of the memory unit 142. The memory unit 142 may be divided into a plurality of segments which may include a user data segment 252 and a controller data private segment 250. The private segment 250 may not be available to users and may include controller firmware, stored partition sizes, or both. Other data may also be stored in the private data segment. The user data segment may be divided into a plurality of partitions, such as a private data partition, read only partition, public data partition, or combinations of partitions. An example of partitions on the user data segment 252 is shown in FIG. 2B Other partitions may be included in other examples. The read only partition 210 may include a partition management application 215, or a user authentication application, or both, among other functionalities. The functionality of the partition management application 215 described herein may be implemented as hardware, firmware, software, or combinations thereof in other examples. While segments have been described, in other examples, segments may not be present, or there may be only a single segment on a memory unit.

The read only partition 210 may include an unlock application. Referring back to FIG. 1, the unlock application may be an autorun application that automatically launches on the host system 130 or may appear as a launchable application when the read only partition 210 of mass storage device is mounted by the host system 130. The unlock application may be used to authenticate a host system or a user of the host system to the mass storage device. For example, through the unlock application, a user may unlock the private partition 220. A logon screen or option may be presented to a user by the host system 130 as directed by the unlock application. Authentication information provided by the host system 130 may be coupled to the smart card 150 for authentication verification. Once authenticated, the smart card device 150 may couple security parameters, such as one or more encryption keys, to the controller 105 for use in encrypting or decrypting data in the private partition 220. In the absence of a smart card, the security parameters may be stored in the controller private segment 250 and may be further encrypted prior to storage. In this manner, security parameters may only be coupled to the controller 105 after authentication, and prior to authentication the security parameters are not available to the controller.

The controller private data segment 250 may also store partition sizes of the partitions on the memory unit 142. The partition sizes may alternatively or in addition be stored in the smart card device 150.

As generally described above, the private data partition 220 may require user authentication prior to accessing the private data partition. Alternatively or in addition, the data stored in the private partition may be stored as encrypted data encrypted by the security engine 110 prior to storage in the memory unit 142. As generally described above, when data is sent from the host system 130 to be stored in a private partition of one or more of the memory unit 142, the data may be encrypted by the security engine 110. The encryption may use one or more encryption keys or other security parameters that may be stored in the smart card device 150 or in controller private data segment 250. The encryption keys or other security parameter may not be provided to the security engine 110 until after authentication in some examples. When the host system 130 requests data from a private partition of the memory unit 142, the security engine 110 decrypts the requested data. Again, one or more keys or security parameters used during the decryption may not be provided to the security engine until after authentication. The decrypted data may then be communicated to the host system 130.

In this manner, as described above, encrypted data is communicated between the controller 105 and a private partition of the user data segment 252 of the memory unit 142. Encrypted data is not generally communicated between the controller 105 and the host system 130. Similarly, unencrypted data is communicated between the host system 130 and the controller 105, but is not generally communicated between the controller 105 and a private partition of the user data segment 252 of the memory unit 142. Accordingly, during operation, the controller 105 may require authentication by the host system 130 prior to accessing a private partition of the user data segment 252 of the memory unit 142. Authentication may occur, for example, by entry of a password or PIN.

The partition management application 215 may provide a resizing utility. The resizing utility allows a user to change a size of the private partition 220, or other partition on the memory unit 142. Generally, the host system 130 may request information regarding a current size of the partitions on the user data segment 252 of the memory unit 142 from the smart card device 150. The controller 105 may retrieve the partition sizes from the smart card device 150 or the controller private data segment 252 and respond to the host system 130 with the requested sizes. A user, which may be an individual user or another application or program, may request the size of one or more partitions using a user interface to the host system 130. Updated partition sizes may be communicated to the controller 105 and the controller 105 will then store the updated partition sizes in the smart card 150 or in the controller private data segment 252. Typically, following resizing, the host system 130 reformats one or more partitions of the memory unit 142 in accordance with the updated partition sizes. A user may be required in some examples to authenticate as an administrator, and/or remove and reinsert the mass storage device 100 prior to the resizing process to complete.

This above described process of resizing may risk compromising security parameters used to encrypt and decrypt encrypted data stored in a private partition, the data stored on the private partition, or both. FIGS. 3A-3C are a schematic illustrations of changes to the user data segment 252 that may occur during resizing procedures. The user data segment 252 may be initially configured as shown in FIG. 3A with a read only partition 210 and a private partition 220. Although shown as taking up the remaining space on the user data segment 252 in FIG. 3A, the private partition 220 may take up any amount of space on the user data segment of the memory unit 142 in different examples, and other partitions may be present.

In the example of FIG. 3B, the user data segment 252 is resized to create a public partition 225. Note that the portions of the user data segment 252 allocated to the public partition 225 were previously allocated to the private partition 220. Accordingly, prior to re-formatting, the public partition 225 may contain encrypted data previously stored in the private partition 220. This may pose a problem if the re-formatting process is interrupted or does not occur, and a host system is able to retrieve encrypted data from the public partition 225. The encrypted data may contain some information about the security process, such as information about one or more security keys used to encrypt the data. By obtaining encrypted data, a hacker or other recipient of the data may be able to determine the security process, security key, or both, used to encrypt the data, the data itself may be compromised, or combinations of these problems may occur.

Further, referring to FIG. 3C, the public partition 225 may be resized to a smaller size, as indicated. A portion 230 of the resultant larger private partition 220, may then contain unencrypted data previously stored by the public partition 225. This may pose a problem if the re-formatting process is interrupted or does not occur, and a host system is able to retrieve decryption of unencrypted data from the private partition 220. Recall that data retrieved from the private partition 220 may be processed by the security engine 110 to decrypt the data prior to transmission to a host system 130. Accordingly, if a hacker or other recipient of the data requests data from the portion 230 of the private partition 220 that holds unencrypted data, the unencrypted data may be processed by the decryption procedure implemented by the security engine 110. The resulting data coupled to the host system 130 would contain information about the decryption procedure. So, for example, if a known data pattern was stored to the public partition 225 such that it became part of the private partition 220 after resizing in FIG. 3C, a recipient retrieving that data from the private partition 230 would receive a version of that known pattern that had passed through a decryption procedure implemented by the security engine 110. Using this decrypted version of a known pattern, the data recipient may be able to determine the security process, security key, or both, that had been used to decrypt the data.

Accordingly, the resizing process described above presents risks to the security of the encryption and decryption process and encrypted data in at least two ways when reformatting is interrupted or not completed. The first is the exposure of encrypted data from a previously private partition in a new or expanded public partition. The second is storage of unencrypted, previously public partition data in a new or expanded private partition. Embodiments of the present invention include systems and methods that may address either one, or both of these risks.

In embodiments of the invention, one or more new security parameters, such as AES encryption/decryption keys, may be generated for use with the private partition as part of resizing process. The AES key generation may take place prior to storing the updated partition sizes in the smart card device 150 or controller private data segment 250. In this manner, referring back to FIG. 3B, any encrypted data stored in the new public partition 225 that may be intercepted will yield clues only to the old key previously used to encrypt the encrypted data. The new key, generated as part of the resizing process, may not be compromised.

Generation of a new key alone, however, may not reduce the second risk described above related to the retrieval of previously unencrypted data in FIG. 3C from the portion 230 of the expanded private partition 220. In that case, retrieval of the data retrieved from the portion 230 of the private partition 220 may still be decoded by the encryption engine using the newly created key. Accordingly, in some embodiments of the invention data stored at the portion 230 of the private partition 220 affected by a resize command may be altered prior to storing the updated size of the partitions in the smart card device 150 or controller private data segment 250. By altering the data in a portion of the memory unit 142 affected by the resize command, such as the portion 230, it may only be unknown data retrieved from that portion 230 and decrypted with the encryption engine. This may reduce the risk that security parameters may be discovered by retrieving data from the portion 230 of the private partition 220. Altering data in one or more portions of the memory unit affected by resizing also addresses the first risk described above, that of exposing encrypted data from a private partition in a new or expanded public partition. Accordingly, when the data of affected portions of the memory unit is altered, a new key may not be generated in some embodiments for use by the security engine.

The affected portion of the memory unit may be altered in any of a variety of ways. In some embodiments, the affected portion of the memory unit may be erased. Erasing may reduce a risk of security parameter discovery, but some risk may remain because erasing may result in known data (such as all zeros or all ones) stored in the affected portion. Further, erasing large portions of the memory unit may be time consuming.

Accordingly, some embodiments of the present invention write data to the affected portion prior to updating the partition sizes in the smart card device 150 or controller private segment 250. Any data may be written to the affected portion. In some embodiments, the data written is unknown or difficult to determine data. For example, a temporary AES key may be generated and used to encrypt some temporary data. The data encrypted with the temporary key may be written to the affected portion. The temporary key may then be deleted. In this manner, the data written to the affected portion may be substantially random, and retrieving it with a new key may yield little to no useful information about the security process.

While in some embodiments only a portion of the memory unit affected by resized partitions is altered, in other embodiments a greater portion of the memory unit may be altered, including the entire memory unit. Altering, such as erasing or writing over, the entire memory unit may avoid processing time to calculate and identify affected portions of the memory unit.

Figure 4:
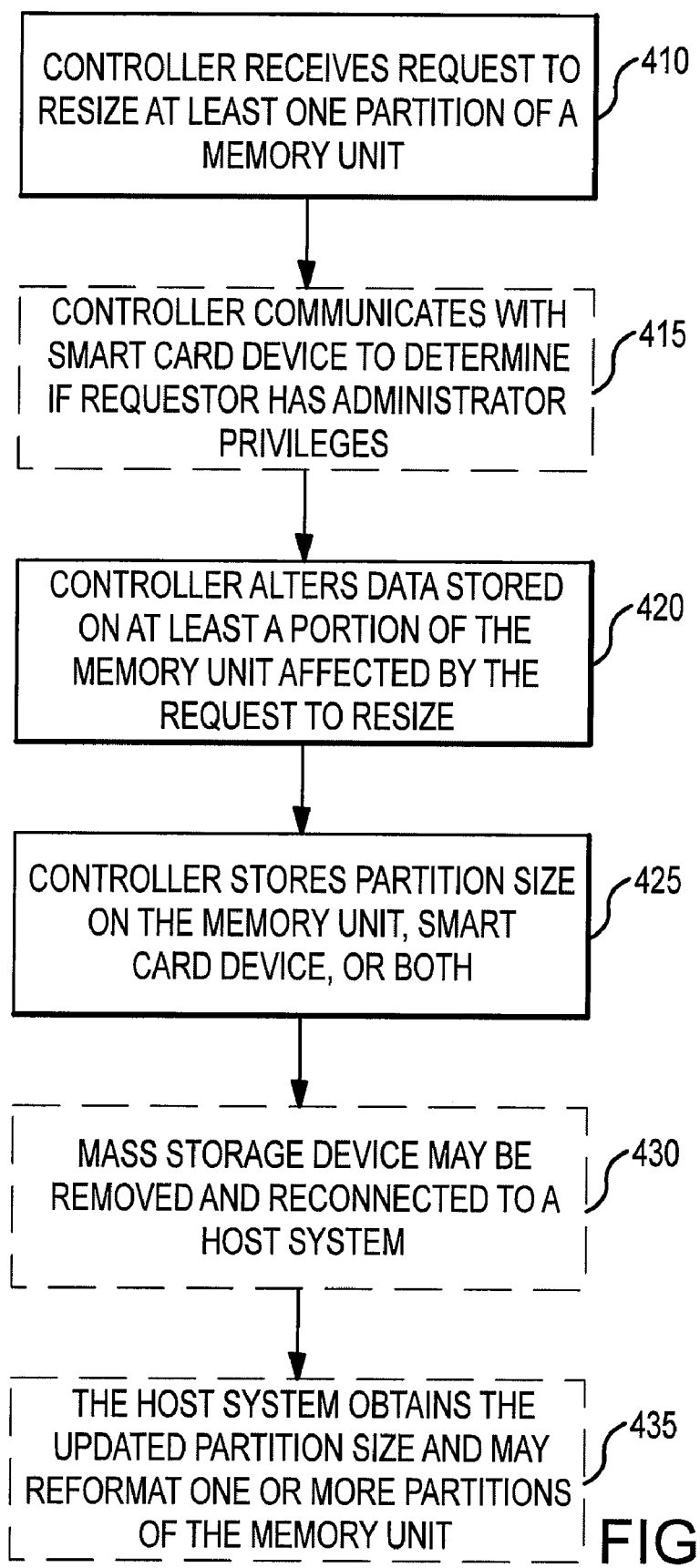
FIG. 4 is a flowchart illustrating an example of a method to resize at least one partition on user data segment of a memory unit on a mass storage device.

A flowchart providing a schematic illustration of a resize process according to an embodiment of the present invention is shown in FIG. 4. A controller of a mass storage device receives 410 a request to resize at least one partition of a memory unit. As described above, the request may be received through use of a resize utility whose instructions may be stored in a read-only partition of the mass storage device and executed by processor on the host computer. The request may originate in a host system coupled to the mass storage device, and may be originated by an operator or other user of the host system or by another application running on or in communication with the host system. The request may include a request to increase or decrease the size of one or more partitions that may be located on user data segment of the memory unit coupled to the controller in the mass storage device. The increase or decrease may be expressed as an absolute size of the memory, or as a percentage, or in any other suitable manner.

The controller may then communicate 415 with the smart card device of the mass storage device to determine if the requestor making the request in 410 had administrator privileges. That is, in some embodiments, authentication or administrator privileges, or both, may be required before the controller acts on a request to resize one or more partitions of the memory units on the mass storage device. In such embodiments, if the requestor does not have administrator privileges or is otherwise not authorized to make resizing requests, the controller may not act on the request.

To act on the request 410, the controller alters 420 data stored on at least a portion of the memory unit affected by the resize request. As generally described above, in some embodiments the controller may calculate a portion of the memory unit affected by the resize request—such as by identifying specific addresses in the memory unit that would move from a public to a private partition or from a private to a public partition. In some embodiments the controller may identify specific addresses in the memory unit that would move from a public to a private partition. In some embodiments, the controller may alter all data stored on the user data segment, or in one or more partitions of the memory device. Accordingly, in some embodiments, the controller may not identify specific addresses affected by the request to resize, but in other embodiments, the controller may identify specific addresses so affected.

Figure 5:
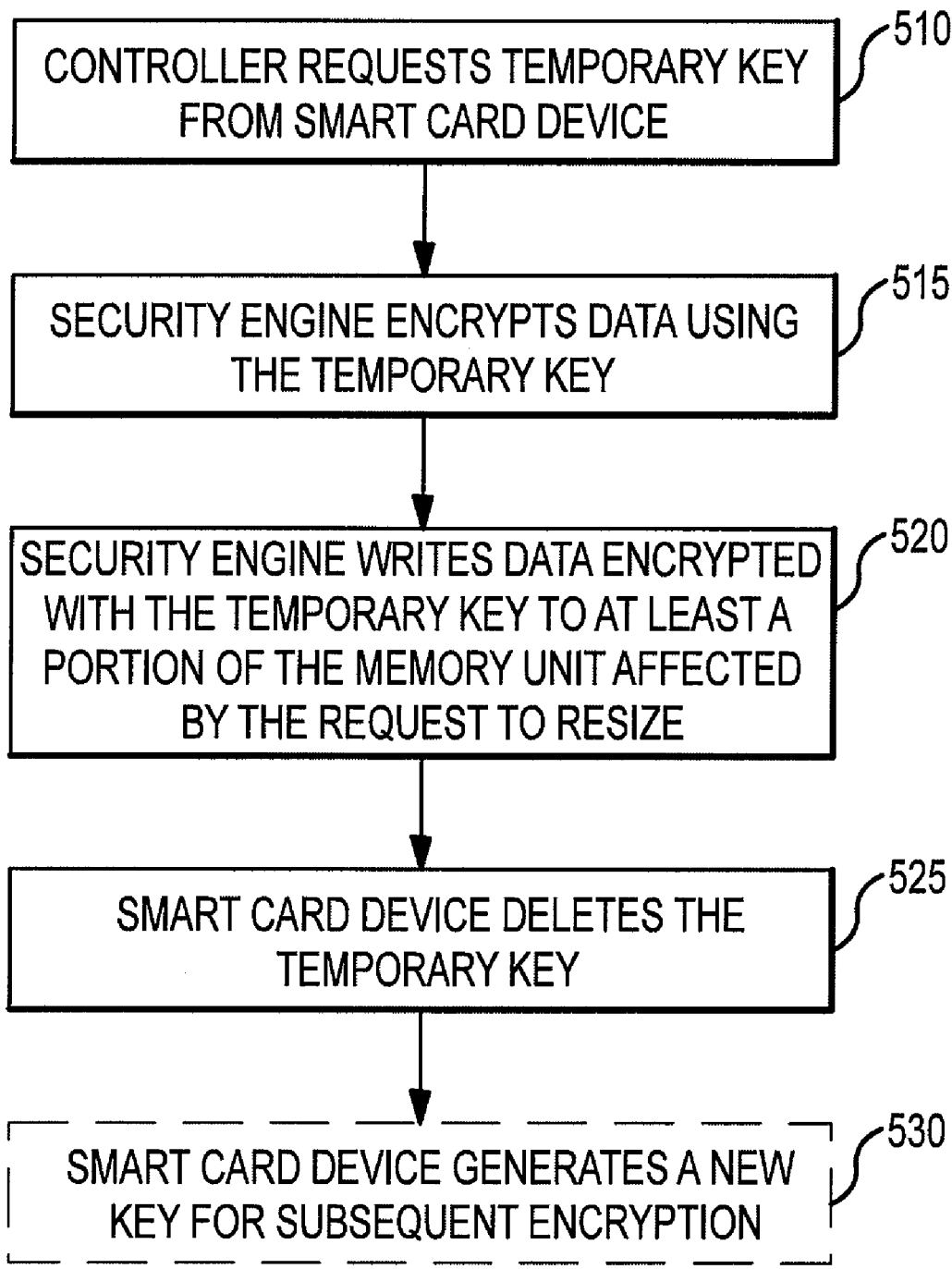
FIG. 5 is a flowchart illustrating an example of a method to alter data on user data segment of a memory unit on a mass storage device.

As generally described above, the data may be altered in any of a variety of ways including erasing or writing data to at least a portion of the memory unit affected by the request to resize or portion of the memory unit that has moved from a public to a private partition. Data written to the portion may be random or predetermined in some embodiments. All the data stored in the portion may be altered, or in some embodiments, portions of the data are altered. FIG. 5 is a flowchart illustrating one example of altering data. The controller may request 510 a temporary key from the smart card device. In other embodiments, the controller may generate the temporary key. The security engine may encrypt data 515 using the temporary key. Any data may be encrypted including random or predetermined data, or data already stored in one or more of the memory units on the mass storage device. In other embodiments, known data may be stored in the mass storage device for this purpose. The security engine writes 520 the data encrypted with the temporary key to at least a portion of the memory unit that has moved from a public to a private partition affected by the request to resize. In other embodiments, the security engine may write the data encrypted with the temporary key to a portion of the memory unit that was affected by the request to resize. The smart card device may erase 525 the temporary key. In other embodiment, the controller will erase the temporary key. The smart card device may generate 530 a new key for subsequent encryption, decryption, or both by the security engine. In other embodiments, the controller may generate a new key for subsequent encryption, decryption, or both by the security engine. In other embodiments, the key used prior to the request to resize may be retained for subsequent use.

Referring back to FIG. 4, after altering 420, the controller stores 425 the partition sizes of the memory units in controller private data segment of the memory unit, the smart card device, or both. By storing the updated partition sizes after altering data and generating a new key, the controller may help to ensure a host system cannot access encrypted data in a new or expanded public partition, or decrypt unencrypted data in a new or expanded private partition. The host system may not receive the updated partition sizes until after the controller has altered data in 420 and generated a new key.

In some embodiments, the mass storage device may be removed and reconnected 430 to the host system, or a different host system. In some embodiments, this removal and reconnection may aid the host in recognizing the updated partition sizes, but in some embodiments, removal and reconnection is not required.

The host system receives 435 the updates partition size or sizes. The partition sizes may be received responsive to a routine request by the host system, for example. The host system may reformat one or more partitions of the memory unit that have been resized. In other embodiments, the host system may reformat all partitions of the memory unit. In some embodiments, authentication may be required before the private partition may be reformatted.

From the foregoing it will be appreciated that, although specific embodiments of the invention have been described herein for purposes of illustration, various modifications may be made without deviating from the spirit and scope of the invention.

What is claimed is:

1. A method for resizing at least one partition of a storage device configured to store data encrypted with a first key, the method comprising: receiving, at the storage device, a request to resize at least one partition of the storage device;
generating a temporary key different than the first key responsive to the request to resize;
encrypting temporary data with the temporary key; and
altering user data stored on the storage device responsive to the request to resize and prior to communicating an updated partition size to a host computer, wherein the act of altering data stored on the storage device comprises altering data stored in at least a portion of the storage device that was in a public partition prior to the resizing and will be in a private partition after the resizing and writing the encrypted temporary data to at least the portion of a storage device affected by the resizing.

2. The method according to claim 1 further comprising storing updated sizes of at least one partition affected by the resizing in the storage device.

3. The method according to claim 2 wherein the act of storing the size of the at least one partition in the memory storage device occurs after the act of altering the data is complete.

4. The method according to claim 1 wherein the act of altering the data comprises erasing the data.

5. The method according to claim 1 further comprising deleting the temporary key from the storage device.

6. The method according to claim 1 wherein the memory unit is in a storage device, the act of generating the temporary key comprises requesting the temporary key from a smart card device in the storage device, wherein the memory unit is separate from the smart card device.

7. The method according to claim 1 further comprising computing a plurality of addresses of the memory unit affected by the resizing, and the act of altering data comprises altering the data stored at the plurality of addresses.

8. A method for resizing at least one partition of a storage device configured to store data encrypted using a security parameter stored in the storage device, the method comprising:
receiving, at the storage device, a request to resize and at least one partition of the storage device;
generating, responsive to the request to resize, a new security parameter for use in encrypting data on the storage device prior to communicating an updated partition size to a host computer;
encrypting data on the storage device with the new security parameter;
resizing the at least one partition;
writing data encrypted with the new security parameter to the resized partition; and
communicating the updated partition size to the host computer, wherein the new security parameter is a temporary key.

9. The method according to claim 8 wherein the new security parameter comprises an AES key.

10. The method according to claim 8 wherein the storage device comprises a smart card, the method further comprising storing the new security parameter in the smart card prior to communicating the updated partition size to the host computer.

11. The method according to claim 8 further comprising generating a plurality of new security parameters prior to communicating the updated partition size to the host computer.

12. A method for resizing partitions on a memory unit including at least a first private partition configured to store data encrypted with a first key and at least a second public partition configured to store unencrypted data, the method comprising:
    launching a resizing utility, instructions for the resizing utility being stored at least in part on the memory unit in the storage device;
    requesting a resizing of least one of the first private partition or the second public partition to the storage device, the storage device configured to generate a temporary key different than the first key responsive to the request to resize, the storage device further configured to alter data stored on at least a portion of the memory unit affected by the request to resize, wherein the at least a portion of the memory unit affected by the request to resize includes a portion that was in the first private partition prior to the resizing and will be in the second public partition after the resizing or a portion that was in the second public partition prior to the resizing and will be in the first private partition after the resizing, wherein the storage device is further configured to alter the data by encrypting temporary data with the temporary key and writing the data encrypted with the temporary key to the portion of the memory unit affected by the request to resize; and receiving the updated partition size from the storage device after the data has been altered.

13. The method according to claim 12 wherein the storage device is configured to alter the data by erasing at least a portion of the data.

14. The method according to claim 12 wherein the storage device is configured to store the updated partition size after the data altering has completed.

15. The method according to claim 12 wherein the act of receiving the updated partition size from the storage device occurs after the storage device has been removed and reinserted into a host system.

16. The method according to claim 12 further comprising formatting at least the resized first or second partition after receiving the updated partition size.

17. A storage device comprising:
    a memory unit configured to store data encrypted using a security parameter, the memory unit including at least a first partition; and
    a controller configured to communicate with a host system and the memory unit, the controller including a security engine configured to encrypt data received from the host system and decrypt data from the memory unit, at least one of the encrypting and decrypting utilizing the security parameter, the controller further configured to receive a request to resize the first partition and, responsive to the request to resize, to alter data stored on at least a portion of the memory unit affected by the request to resize prior to communicating an updated partition size to the host system, wherein the at least a portion of the memory unit affected by the request to resize includes a portion that was in the first partition prior to the resizing and will not be in the first partition after the resizing or a portion that was not in the first partition prior to the resizing and will be in the first partition after the resizing, wherein the security parameter comprises a key, and the controller is configured to request a temporary key responsive to the request to resize, the security engine configured to encrypt data using the temporary key, and store the data encrypted using the temporary key to the portion of the memory unit affected by the request to resize.

18. The storage device according to 17, further comprising: a smart card device configured to store the security parameter; and wherein the controller is further configured to communicate with the smart card device.

19. The storage device according to 17 wherein the memory unit includes a controller data segment configured to store the security parameter.

20. The storage device according to claim 17 wherein the controller is configured to store the updated partition size after the data altering is complete.

21. The storage device according to claim 17 wherein the controller is configured to alter the data by erasing the data.

22. The storage device according to claim 17 wherein the storage device is further configured to delete the temporary key.

23. The storage device according to claim 17 wherein the security parameter is a first parameter and the storage device is further configured to generate a second security parameter, the security engine configured to utilize the second security parameter to encrypt or decrypt data after the updated partition size is stored.

24. The storage device according to claim 17 wherein the memory unit further includes a second partition, the first partition configured to store encrypted data, and the second partition configured to store unencrypted data, the request to resize including a request to increase a size of the first partition and decrease a size of the second partition, the at least a portion of the memory unit affected by the resize including a memory portion to be moved from the second partition to the first partition.

25. The storage device according to claim 17 wherein the memory unit further includes a second partition, the first partition configured to store encrypted data, and the second partition configured to store unencrypted data, the request to resize including a request to decrease a size of the first partition and increase a size of the second partition, the at least a portion of the memory unit affected by the resize including a memory portion to be moved from the first partition to the second partition.

26. The storage device according to claim 17 the controller further configured to determine if an originator of the request to resize had administrator privileges prior to altering the data.

27. The storage device according to claim 12, the controller further configured to communicate with the smart card device to determine if the originator of the request to resize had administrator privileges.

* * * * *

UNITED STATES PATENT AND TRADEMARK OFFICE
CERTIFICATE OF CORRECTION

PATENT NO. : 8,370,645 B2
APPLICATION NO. : 12/397149
DATED : February 5, 2013
INVENTOR(S) : Mehdi Asnaashari It is certified that error appears in the above-identified patent and that said Letters Patent is hereby corrected as shown below:

In the Claims:

In column 10, line 12, in Claim 18, after "according to" insert -- claim --.

In column 10, line 16, in Claim 19, after "according to" insert -- claim --.

Signed and Sealed this
Seventh Day of May, 2013

Teresa Stanek Rea
*Acting Director of the United States Patent and Trademark Office*